United States Patent
Babiana et al.

(10) Patent No.: US 7,322,880 B1
(45) Date of Patent: Jan. 29, 2008

(54) COLLAPSIBLE ANGLER WORK STATION

(76) Inventors: Christopher G. Babiana, 410 Pulaski Blvd., Bellingham, MA (US) 02019; Steven J. Charron, 35 Buxton St., Harrisville, RI (US) 02830

( * ) Notice: Subject to any disclaimer, the term of this patent is extended or adjusted under 35 U.S.C. 154(b) by 372 days.

(21) Appl. No.: 11/101,744

(22) Filed: Apr. 7, 2005

Related U.S. Application Data

(60) Provisional application No. 60/561,104, filed on Apr. 8, 2004.

(51) Int. Cl.
*A22C 25/06* (2006.01)
(52) U.S. Cl. .................................................. 452/194
(58) Field of Classification Search .................. 452/194
See application file for complete search history.

(56) References Cited

U.S. PATENT DOCUMENTS

| | | | | |
|---|---|---|---|---|
| 3,668,739 | A | * | 6/1972 | Lewis .......................... 452/194 |
| 4,229,858 | A | * | 10/1980 | Baxter et al. ................ 452/194 |
| 5,098,338 | A | * | 3/1992 | Jensen ......................... 452/194 |
| 5,609,521 | A | | 3/1997 | Allred et al. |
| 6,200,212 | B1 | * | 3/2001 | Henry et al. ................. 452/194 |
| 6,554,691 | B1 | * | 4/2003 | Schauls ....................... 452/194 |

* cited by examiner

*Primary Examiner*—Thomas Price
(74) *Attorney, Agent, or Firm*—John P. McGonagle

(57) ABSTRACT

A collapsible work station. Three locking hinges are used to ensure the work station is secure. The hinges rotate and lock in place. The work station is supported on a telescoping leg, capped with a thick rubber boot to protect the boat deck. A quick release clamp snaps open and shut with the flick of a thumb, firmly locking the leg in place.

20 Claims, 6 Drawing Sheets

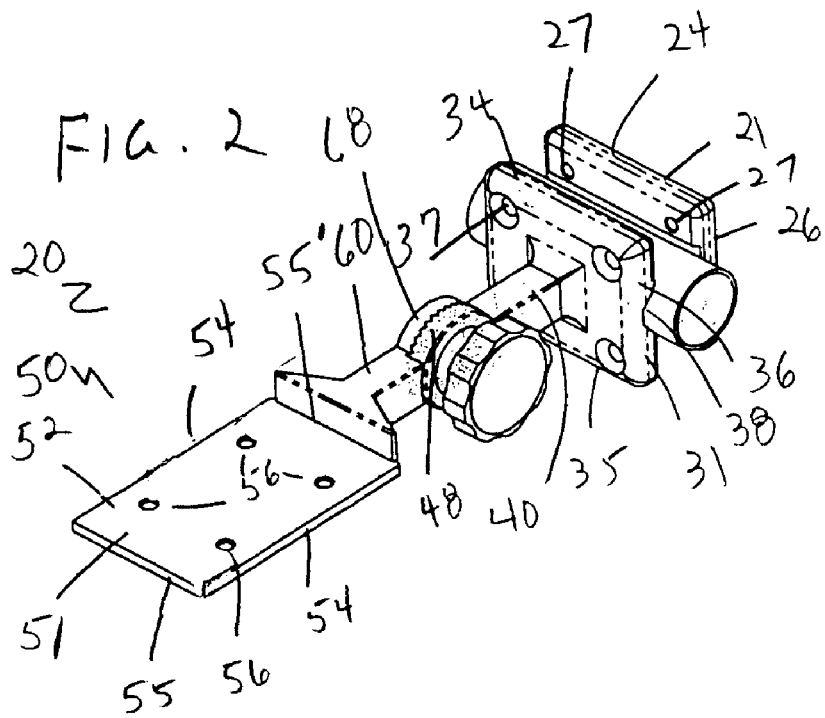
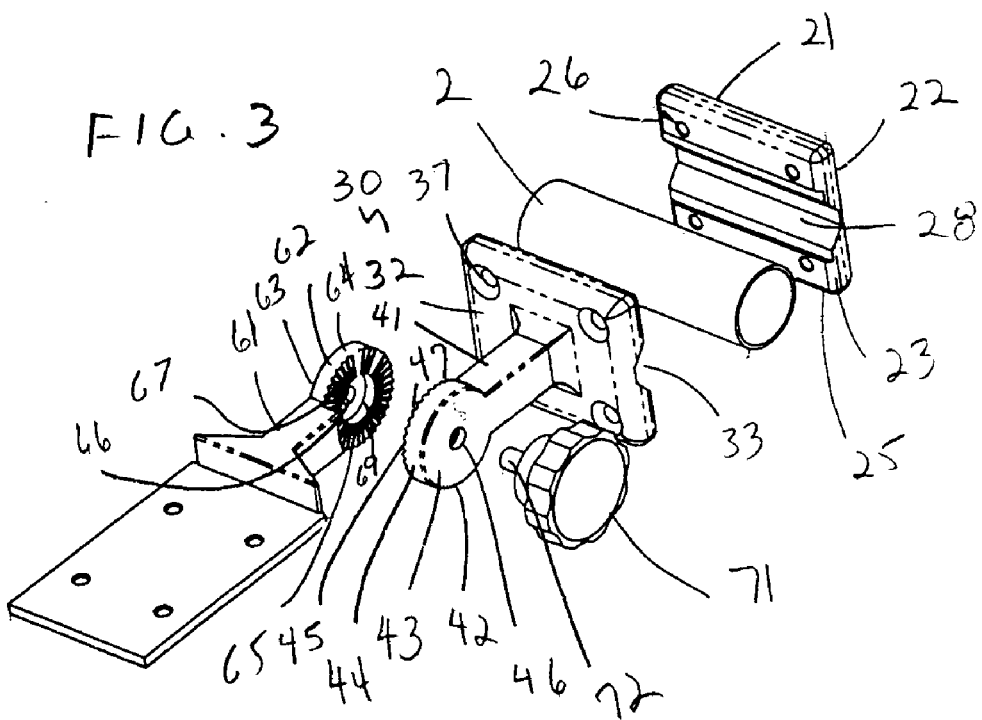

# US 7,322,880 B1

COLLAPSIBLE ANGLER WORK STATION

RELATED U.S. APPLICATION DATA

This application claims the benefit of Provisional Application 60/561,104, filed on Apr. 8, 2004.

BACKGROUND OF THE INVENTION

This invention relates to boat attachments, and in particular, to boat-mounted, collapsible tray useful as a work station for chumming, bait rigging and filleting during fishing operations.

Most boats used by sports fishermen have no facilities for cleaning fish. The after decks and gunwales of sportfishing boats are often not flat, and therefore cannot properly accommodate an ordinary tray set thereon. Even when said surfaces are flat they are seldom of the proper working height.

Heretofore, typical fish cleaning devices have several drawbacks. Most devices use rigid, deep trough structures to hold the fish which are large and bulky and take up valuable storage area when not in use. In addition, such devices cannot be used on all gunwales and hull designs. Hand rails, molding and ornament designs along the top surface of the gunwale often prevent these devices from being properly attached to the gunwale.

It is known in the prior art for fisherman to use a flat bait cutting board to support bait while it is being cut. It is preferred that the bait cutting board be placed at a convenient height to that the fisherman does not have to bend over to use it. However, as stated above, it is not always easy to find an ideal location to use a conventional bait cutting board. Also, when a conventional bait cutting board is placed in a location where unwanted parts of the bait can be conveniently swept from the bait cutting board, there is usually no way to secure the bait cutting board and it is subject to loss overboard.

SUMMARY OF THE INVENTION

It is a primary object of this invention to provide for commercial and non-commercial anglers alike a suitable work station for chumming, bait rigging and filleting during day to day fishing excursions or weekend outings. The present invention provides a collapsible work station. Functionally designed to be ergonomically correct, the present invention work station stance is at proper height when in use and easily folded away when not in use.

Three locking hinges are used to ensure the work station is secure, taking the weight of the fisherman's work and keeping the station down in the wind. The hinges rotate and lock in place. The work station is supported on a telescoping leg, capped with a thick rubber boot to protect the boat deck. A quick release clamp snaps open and shut with the flick of a thumb, firmly locking the leg in place.

The work station fits most leaning posts with fiberglass backs and whale tails, and accommodates a wide range of whale tail tube sizes. In larger applications such as charter boats, the work station may be mounted directly to a gunnel wall or any flat or tubular surface.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 2 is an invention mount assembly.
FIG. 3 is an exploded view of a mount assembly.

DETAILED DESCRIPTION OF INVENTION

Figure 1:
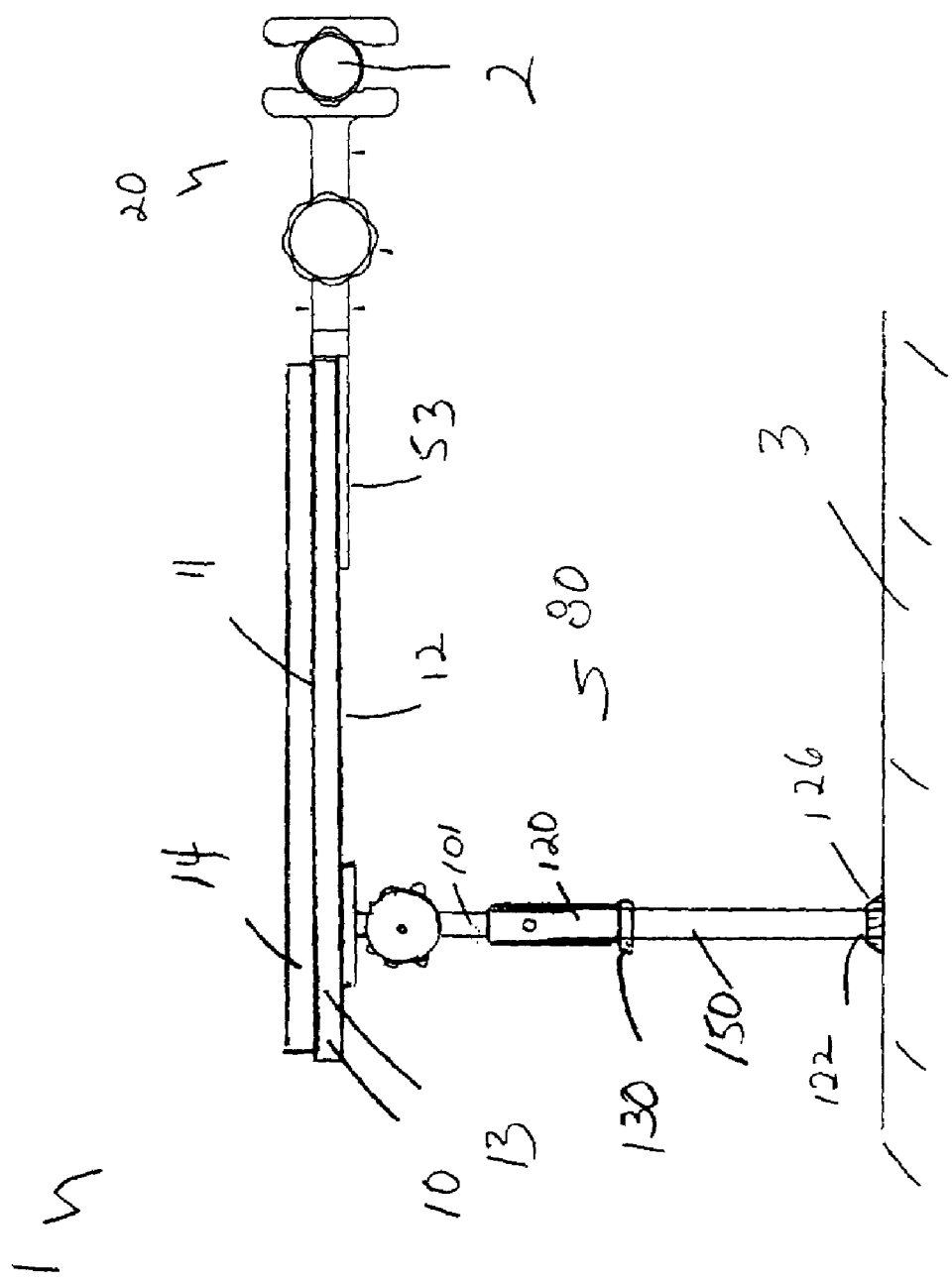
FIG. 1 is a side view of a work station constructed according to the invention.
Figure 4:
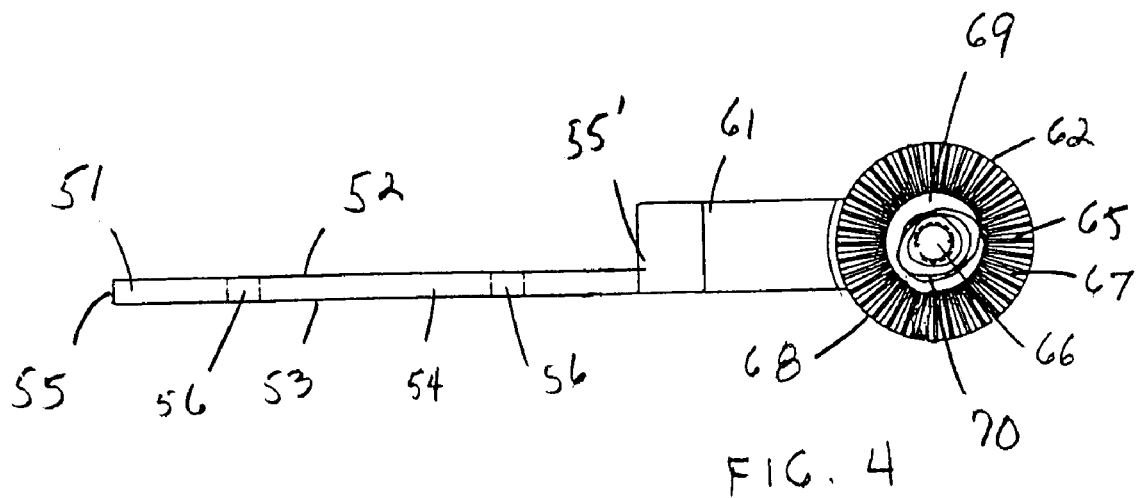
FIG. 4 is a side view of the support plate subassembly.
Figure 5:
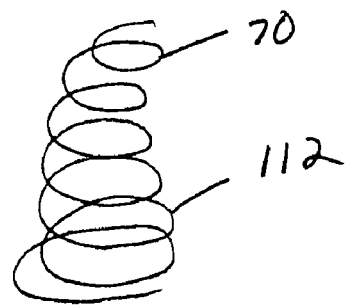
FIG. 5 is a view of a conical spring.
Figure 6:
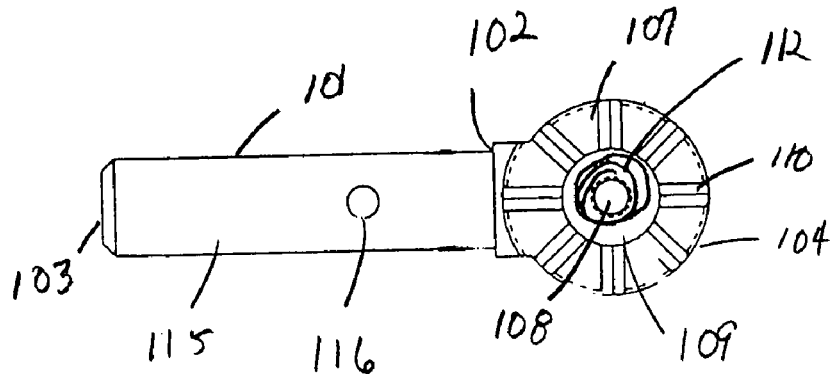
FIG. 6 is a side view of a leg hinge subassembly.
Figure 7:
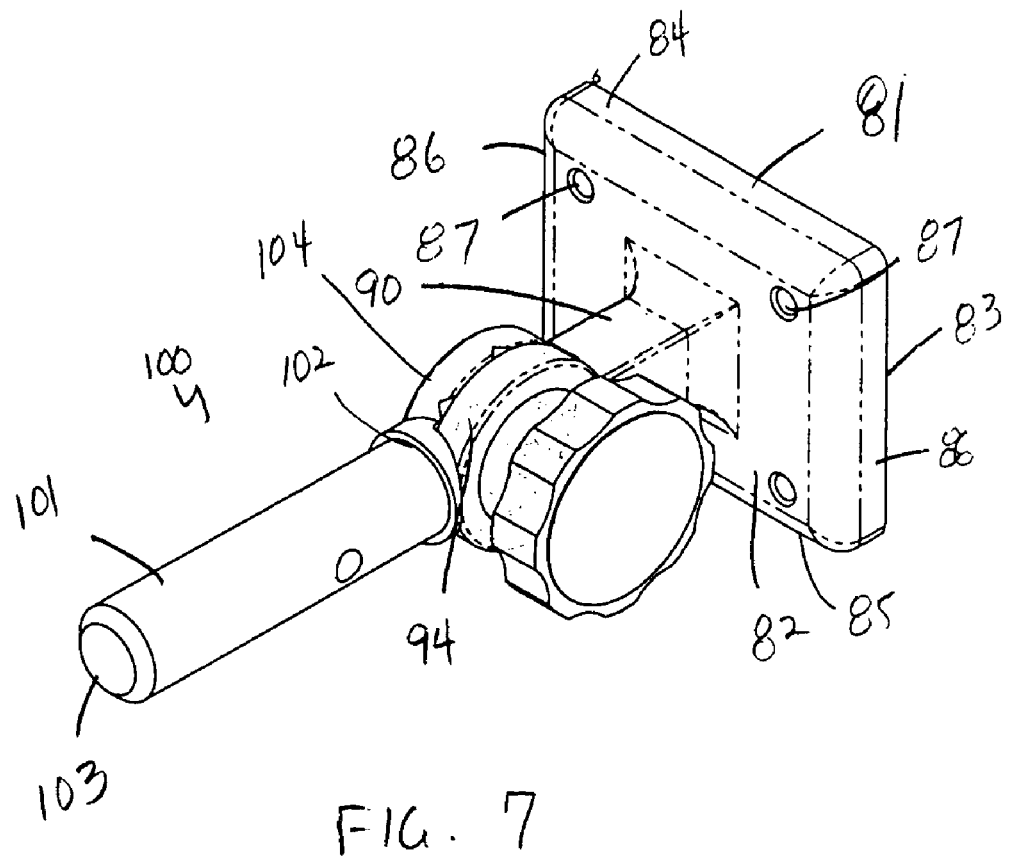
FIG. 7 is an invention leg assembly.
Figure 8:
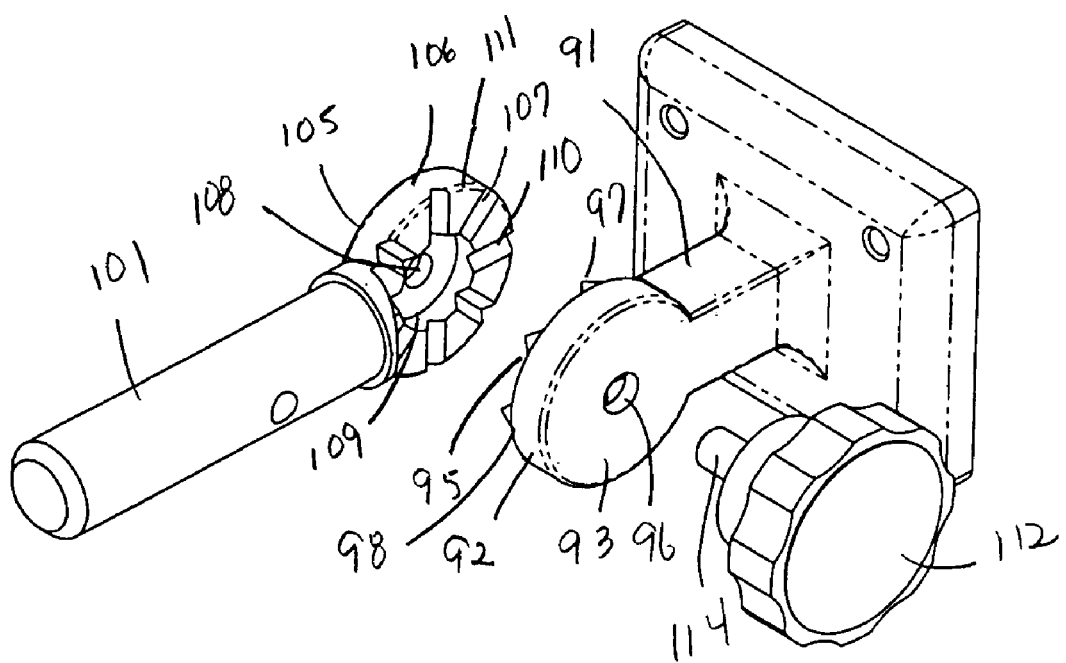
FIG. 8 is an exploded view of a leg assembly.
Figure 9:
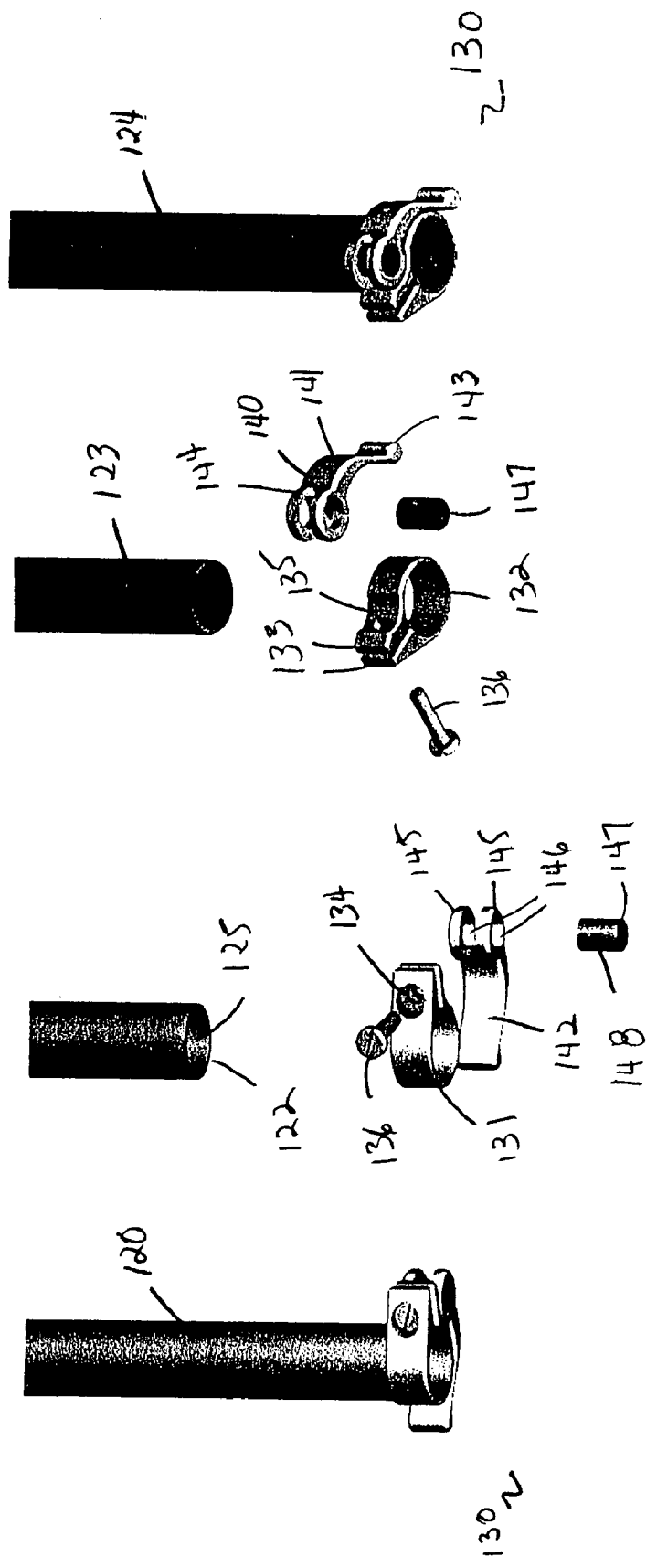
FIG. 9A is a perspective view of a clamp assembly.
FIG. 9B is an exploded view of the clamp assembly of FIG. 9A.
FIG. 9C is another perspective view of a clamp assembly.
FIG. 9D is an exploded view of the clamp assembly of FIG. 9C.
Figure 10:
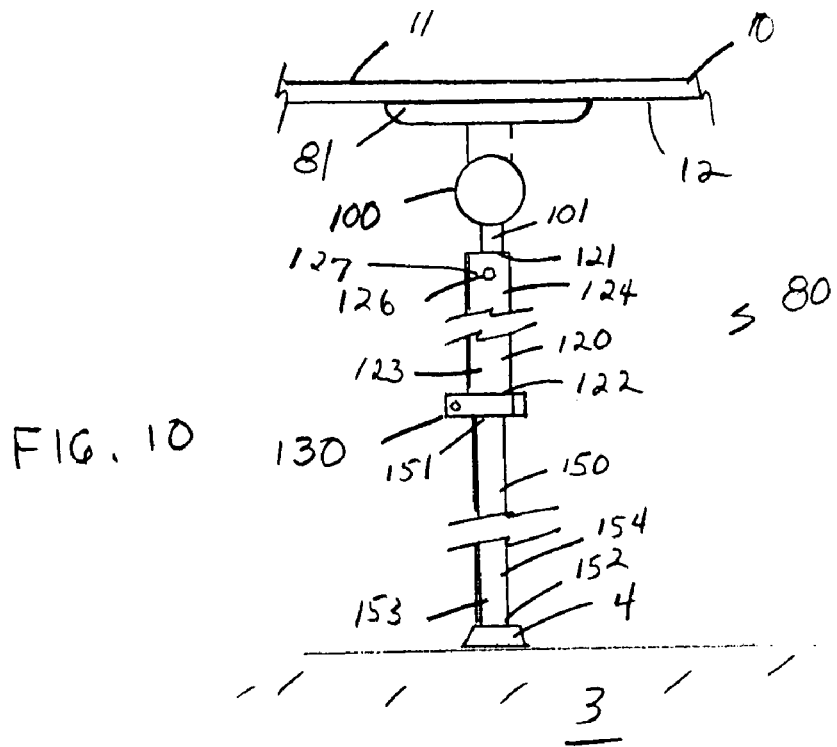
FIG. 10 is a front view of the leg assembly with leg tubes.
Figure 11:
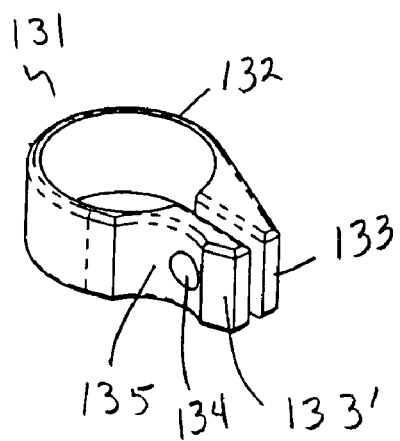
FIG. 11 is a perspective view of a clip element.
Figure 12:
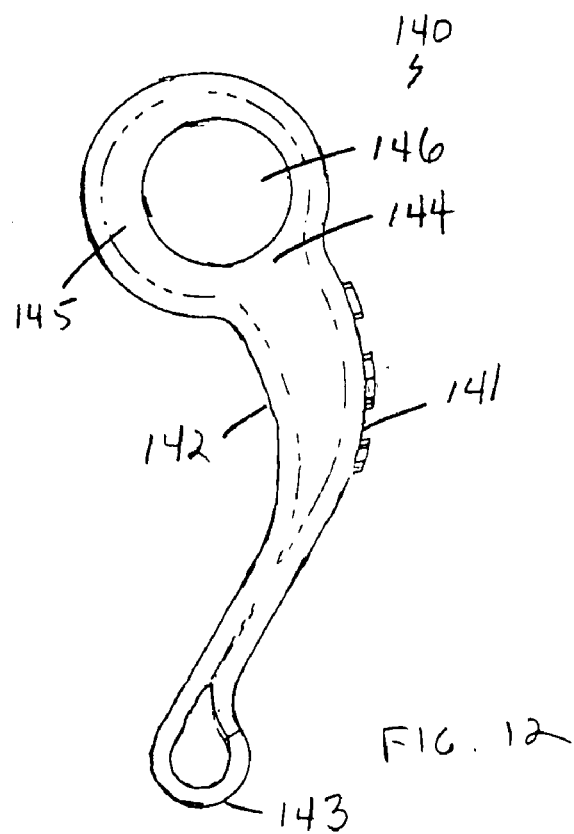
FIG. 12 is a top view of a locking clamp.

Referring to the drawings in detail wherein like elements are indicated by like numerals, there is shown a work station 1 constructed according to the principles of the invention. The work station 1 is comprised of workboard 10 supported by two mount assemblies 20 and a leg assembly 80. The workboard 10 is planer, and preferably has a generally rectangular shape. The workboard 10 has an upper work surface 11, an opposite lower support surface 12, and a perimeter edge 13. An upwardly extending flange 14 may be formed or attached to all or a portion of the perimeter edge 13. The workboard 10 is preferably made from an ultraviolet-stabilized, high density polyethylene and is preferably ½ inch thick. The workboard 10 resists deterioration from damaging ultraviolet radiation; is easy to clean; and is stain resistant.

Each mount assembly 20 is comprised of a backing plate 21, a hinge subassembly 30 and a support plate subassembly 50. The backing plate 21 has a generally rectangular shape and lies in a general vertical plane. The backing plate 21 has a flat mounting surface 22, an opposite holding surface 23, a top edge 24, an opposite bottom edge 25, and two opposite side edges 26. Four apertures 27 are formed in the backing plate, said apertures extending from the holding surface 23 through the mounting surface 22. The apertures 27 are located near to a junction of the top edge and a side edge, and to a junction of the bottom edge and a side edge. The holding surface 23 has a central groove 28 formed horizontally across its face, said groove extending from side edge 26 to side edge 26.

The hinge subassembly 30 is comprised of a generally rectangular hinge plate 31 lying in a general vertical plane. The hinge plate 31 has a hinge surface 32, an opposite gripping surface 33, a top edge 34, an opposite bottom edge 35, and two opposite side edges 36. Four apertures 37 are formed in the hinge plate, said apertures extending from the gripping surface 33 through the hinge surface 32. The apertures 37 are located near to a junction of the top edge and a side edge, and to a junction of the bottom edge and a side edge. The gripping surface 33 has a central groove 38 formed horizontally across its face, said groove extending from side edge 36 to side edge 36.

Extending horizontally and centrally from the hinge plate hinge surface 32 is a hinge holding element 40 comprised of a generally rectangular portion 41 terminating in a cylindrical element 42, said rectangular portion 41 having a longitudinal axis defined by said cylindrical element 42 and said hinge plate hinge surface 32, said rectangular portion longitudinal axis being perpendicular to said hinge plate 31. The rectangular portion 41 has a rectangular cross section. The cylindrical element 42 has a flat side 43 from which a cylindrical side wall 44 extends horizontally toward a toothed side 45. The cylindrical element sides 43, 45 have vertical, radial planes parallel to each other and perpendicular to the plane of the hinge plate hinge surface 32. The cylindrical element 42 has a central aperture 46 extending from the flat side 43 through the toothed side 45. Surrounding the central aperture 46 is a circular channel 49 extending from the toothed side 45 toward but not reaching the flat side 43. The toothed side 45 has a plurality of radial teeth 47 extending from said circular channel 49 to a side perimeter 48 defined by said side wall 44. The cylindrical element 42 has a thickness defined as the distance between the cylindrical element flat side 43 and toothed side 45, said cylindrical element thickness being approximately one-half the cross sectional width of the rectangular portion 41, said rectangular portion cross sectional width being defined as the distance between opposite rectangular portion sides.

The support plate subassembly 50 is comprised of a generally flat, rectangular holding plate 51 lying in a general horizontal plane. The holding plate 51 has a flat upper surface 52, an opposite flat bottom surface 53, two opposite long side edges 54, and two opposite short side edges 55. Four apertures 56 are formed in the holding plate, said apertures extending from the upper surface 52 through the bottom surface 53. The apertures 56 are located near to a junction of a long edge and a side edge.

Extending horizontally and centrally from one of the holding plate short edges 55' is a support plate holding element 60 comprised of a generally rectangular portion 61 terminating in a cylindrical element 62, said rectangular portion 61 having a longitudinal axis defined by said cylindrical element 62 and said holding plate short edge 55', said rectangular portion longitudinal axis being perpendicular to said holding plate short edge 55'. The rectangular portion 61 has a rectangular cross section. The cylindrical element 62 has a flat side 63 from which a cylindrical side wall 64 extends horizontally toward a toothed side 65. The cylindrical element sides 63, 65 have vertical, radial planes parallel to each other and perpendicular to the plane of the holding plate 51. The cylindrical element 62 has a threaded central aperture 66 extending from the flat side 63 through the toothed side 65. Surrounding the central aperture 66 is a circular channel 69 extending from the toothed side 65 toward but not reaching the flat side 63. The toothed side 65 has a plurality of radial teeth 67 extending from said circular channel 69 to a side perimeter 68 defined by said side wall 64. The cylindrical element 62 has a thickness defined as the distance between the cylindrical element flat side 63 and toothed side 65, said cylindrical element thickness being approximately one-half the cross sectional width of the rectangular portion 61, said rectangular portion cross sectional width being defined as the distance between opposite rectangular portion sides.

Each mount assembly 20 is attached to the workboard 10 by attaching each support plate subassembly holding plate 51 to the workboard 10, wherein a holding plate upper surface 52 is positioned against the workboard lower support surface 12 adjacent a workboard perimeter edge 13. Four fasteners 57 are inserted into the holding plate apertures 56 extending into and fixedly attaching to the workboard lower support surface 12.

The support plate assembly 50 is joined to the hinge subassembly 30 by joining the support plate holding element cylindrical element toothed side 65 with the hinge subassembly holding element cylindrical element toothed side 45 in a toothed engagement. A conical spring 70 is inserted into the support plate holding element circular channel 69. A knob 71 with a threaded protrusion 72 is inserted into the hinge holding element central aperture 46, threaded protrusion first through the flat side 43, past the toothed side 45, through the conical spring 70, into threaded engagement with the support plate holding element cylindrical element threaded central aperture 66.

Each mount assembly 20 may be directly attached to a flat surface by fasteners inserted through the hinge plate apertures 37 directly into the flat surface. Alternatively, each mount assembly may be attached to a tube 2, such as a leaning post tube wherein the mount assembly backing plate holding surface central groove 28 and hinge subassembly hinge plate gripping surface central groove 38 form a sandwich arrangement about the tube 2. Fasteners are inserted through the backing plate apertures 27 and hinge plate apertures 37, snugly holding both plates 21, 31 in position about the tube 2.

The leg assembly 80 is comprised of a leg mounting plate 81, a holding element 90, and a leg hinge subassembly 100. The leg mounting plate 81 has a hinge surface 82, an opposite flat mounting surface 83, a top edge 84, an opposite bottom edge 85, and two opposite side edges 86. Four apertures 87 are formed in the mounting plate, said apertures extending from the mounting surface 83 through the hinge surface 82. The apertures 87 are located near to a junction of the top edge and a side edge, and to a junction of the bottom edge and a side edge.

Extending horizontally and centrally from the hinge surface 82 is a hinge holding element 90 comprised of a generally rectangular portion 91 terminating in a cylindrical element 92, said rectangular portion 91 having a longitudinal axis defined by said cylindrical element 92 and said hinge surface 82, said rectangular portion longitudinal axis being perpendicular to said leg hinge plate 81. The rectangular portion 91 has a rectangular cross section. The cylindrical element 92 has a flat side 93 from which a cylindrical side wall 94 extends toward a toothed side 95. The cylindrical element sides 93, 95 radial planes parallel to each other and perpendicular to the plane of the hinge surface 82. The cylindrical element 92 has a central aperture 96 extending from the flat side 93 through the toothed side 95. Surrounding the central aperture 96 is a circular channel 99 extending from the toothed side 95 toward but not reaching the flat side 93. The toothed side 95 has a plurality of radial teeth 97 extending from said circular channel 99 to a side perimeter 98 defined by said side wall 94. The cylindrical element 92 has a thickness defined as the distance between the cylindrical element flat side 93 and toothed side 95, said cylindrical element thickness being approximately one-half the cross sectional width of the rectangular portion 91, said rectangular portion cross sectional width being defined as the distance between opposite rectangular portion sides.

The leg hinge subassembly 100 is comprised of a tubular element 101 having a proximal end 102 and a distal end 103, said proximal and distal ends defining a tubular element longitudinal axis. The tubular element proximal end 102 is connected to a cylindrical element 104. The cylindrical element 104 has a flat side 105 from which a cylindrical side wall 106 extends toward a toothed side 107. The cylindrical element 104 has a threaded central aperture 108 extending from the flat side 105 through the toothed side 107. Surrounding the central aperture 108 is a circular channel 109 extending from the toothed side 107 toward but not reaching the flat side 105. The toothed side 107 has a plurality of radial teeth 110 extending from said circular channel 109 to a side perimeter 111 defined by said side wall 106. The cylindrical element 104 has a thickness defined as the distance between the cylindrical element flat side 105 and toothed side 107, said cylindrical element thickness being approximately one-half the cross sectional diameter of the tubular element 101.

The holding element 90 is joined to the leg hinge subassembly 100 by joining the holding element cylindrical element toothed side 95 with the tubular element cylindrical element toothed side 107 in a toothed engagement. A conical spring 112 is inserted into the tubular element cylindrical element circular channel 109. A knob 113 with a threaded protrusion 114 is inserted into the holding element cylindrical element central aperture 96, threaded protrusion first through the flat side 93, past the toothed side 95, through the conical spring 112, into threaded engagement with the tubular element cylindrical element threaded central aperture 108.

The leg hinge assembly tubular element 101 has a cylindrical wall 115 extending from said proximal end 102 to said distal end 103. The tubular element cylindrical wall 115 has an aperture 116 formed therein. The tubular element distal end 103 is inserted into a first hollow leg tube 120. The first leg tube 120 has a proximal end 121, a distal end 122, a cylindrical side wall 123 extending from the proximal end 121 to the distal end 122, an exterior side wall surface 124, said side wall, proximal end and distal end defining a first leg tube hollow interior 125. The first leg tube cylindrical side wall 123 has an aperture 126 formed therein. The tubular element distal end 103 is inserted through the first leg tube proximal end 121 into the first leg tube interior 125. The tubular element aperture 116 is aligned with said first leg tube aperture 126. A fastener 127 is inserted through the apertures 116, 126 thereby fixedly fastening the tubular element 101 and first leg tube 120 together.

The leg assembly 80 includes a second leg tube 150 having a proximal end 151, a distal end 152, a cylindrical side wall 153 extending from the proximal end 151 to the distal end 152, an exterior side wall surface 154, said side wall, proximal end and distal end defining a first leg tube hollow interior 155. The second tube proximal end 151 is inserted through the first leg tube distal end 122 into the first leg tube interior 125 in telescopic engagement. The second leg tube distal end 152 terminates in a rubber footing 4 to protect the boat deck 3.

A clamp assembly 130 holds the first leg tube 120 in position along the second leg tube exterior side wall surface 154 and is positioned adjacent the first leg tube distal end 122. The clamp assembly 130 is comprised of a clip element 131 in engagement with a locking clamp 140. The clip element 131 has an elongated body portion 132 terminating in two ends 133, said clip element body portion 132 being bent into a circular shape adapted to fit about the leg tube exterior surface 124, said ends 133 protruding radially away from the circular body portion 132 in a parallel relationship. Each end 133 has an aperture 134 formed therein, said end apertures 134 being parallel with each other. One of said ends 133' has a groove 135 formed on its outer surface.

The locking clamp 140 is an elongated, curved element having an outer convex surface 141, an concave inner surface 142, a rounded gripping end 143 and a holding end 144, said ends defining an elongated locking clamp axis. The holding end 144 is formed into two parallel rings 145, said rings having a central axis perpendicular to the locking clamp axis. The rings 145 each have off-centered central openings 146. A cylindrical plug 147 is frictionally inserted into the ring openings 146. The cylindrical plug 147 has a radial aperture 148 formed therein along an approximate central diameter. A fastener 136 is inserted through the clip element apertures 134 into the plug aperture 147. The locking clamp rings 145 are positioned against the clip element groove 135. Because of the off-center ring openings 146, the locking clamp 140 has a greater ring density when the clamp lays against the leg tube side wall 123. This greater density provides a locking force holding the leg tube 120 in a desired position along the tubular element 101.

It is understood that the above-described embodiment is merely illustrative of the application. Other embodiments may be readily devised by those skilled in the art which will embody the principles of the invention and fall within the spirit and scope thereof.

We claim:

1. A boat-mounted, collapsible work station, comprising:
a workboard having an upper work surface, an opposite lower support surface, and a perimeter edge;
a plurality of mount assemblies attached to and supporting said workboard, comprising:
a hinge subassembly, comprising:
a generally rectangular hinge plate having a hinge surface, an opposite gripping surface, a top edge, an opposite bottom edge, and two opposite side edges, said gripping surface having a central groove formed horizontally across its face, said groove extending from side edge to side edge;
a plurality of apertures formed in the hinge plate, said apertures extending from the gripping surface through the hinge surface, said apertures being located near to a junction of the top edge and a side edge, and to a junction of the bottom edge and a side edge;
a hinge holding element extending centrally out from the hinge plate hinge surface, comprising:
a generally rectangular hinge holding element portion terminating in a hinge holding element cylindrical element, said hinge holding element rectangular portion having a longitudinal axis defined by said hinge holding element cylindrical element and said hinge plate hinge surface, said hinge holding element rectangular portion longitudinal axis being perpendicular to said hinge plate;
wherein said hinge holding element cylindrical element has a flat side from which a cylindrical side wall extends toward a toothed side, said hinge holding element cylindrical element sides having radial planes parallel to each other and perpendicular to a hinge plate hinge surface plane, said hinge holding element cylindrical element having a central aperture extending from the flat side through the toothed side, said hinge holding element cylindrical element having a circular channel surrounding the central aperture and extending from the toothed side toward said flat side, said toothed side having a plurality of radial teeth extending from said circular channel to a side perimeter defined by said side wall, said hinge holding element cylindrical element having a thickness defined as the distance between the hinge holding element cylindrical element flat side and the toothed side, said hinge holding element cylindrical element thickness being approximately one-half a cross sectional width of the hinge holding element rectangular portion, said hinge holding element rectangular portion cross sectional width being defined as the distance between opposite rectangular portion sides; and a support plate subassembly attached to said hinge subassembly; and a leg assembly attached to and supporting said workboard.

2. A collapsible work station as recited in claim 1, wherein each said support plate subassembly is comprised of:

a generally flat, rectangular holding plate having a flat upper surface, an opposite flat bottom surface, two opposite long side edges, and two opposite short side edges, said holding plate having a plurality of apertures formed therein, said holding plate apertures extending from the upper surface through the bottom surface, said holding plate being located near to a junction of a long edge and a side edge;

a support plate holding element extending centrally from one of the holding plate short edges, said support plate holding element being comprised of a generally rectangular support plate holding element portion terminating in a support plate holding element cylindrical element, said rectangular support plate holding element portion having a longitudinal axis defined by said support plate holding element cylindrical element and said holding plate short edge, said rectangular support plate holding element portion longitudinal axis being perpendicular to said holding plate short edge and being in a plane parallel to a holding plate flat upper surface plane;

wherein said support plate holding element cylindrical element has a flat side from which a cylindrical side wall extends toward a toothed side, said support plate holding element cylindrical element sides having radial planes parallel to each other and perpendicular to said holding plate flat upper surface plane, said support plate holding element cylindrical element having a threaded central aperture extending from the flat side through the toothed side, said support plate holding element cylindrical element having a circular channel surrounding the central aperture and extending from the toothed side toward said flat side, said support plate holding element cylindrical element toothed side having a plurality of radial teeth extending from said circular channel to a side perimeter defined by said side wall, said support plate holding element cylindrical element having a thickness defined as the distance between the support plate holding element cylindrical element flat side and toothed side, said support plate holding element cylindrical element thickness being approximately one-half the cross sectional width of the support plate holding element rectangular portion, said rectangular support plate holding element portion cross sectional width being defined as the distance between opposite rectangular portion sides;

wherein each holding plate upper surface is positioned against the workboard lower support surface adjacent a workboard perimeter edge;

a plurality of fasteners are inserted into the holding plate apertures extending into and fixedly attaching to the workboard lower support surface.

3. A collapsible work station as recited in claim 2, further comprising:

a conical spring inserted into the support plate holding element circular channel;

wherein the support plate holding element cylindrical element toothed side is joined with the hinge subassembly holding element cylindrical element toothed side in a toothed engagement;

wherein a knob with a threaded protrusion is inserted into the hinge holding element central aperture, threaded protrusion first through the flat side, past the toothed side, through the conical spring, into threaded engagement with the support plate holding element cylindrical element threaded central aperture.

4. A collapsible work station as recited in claim 3, wherein said leg assembly is comprised of:

a leg mounting plate joined to said workboard;

a holding element joined to said leg mounting plate; and a leg hinge subassembly joined to said holding element.

5. A collapsible work station as recited in claim 4, wherein:

said leg mounting plate has a hinge surface, an opposite flat mounting surface, a top edge, an opposite bottom edge, and two opposite side edges, said leg mounting plate having a plurality of apertures extending from the mounting surface through the hinge surface, said apertures being located near to a junction of the top edge and a side edge, and to a junction of the bottom edge and a side edge.

6. A collapsible work station as recited in claim 5, wherein:

a leg assembly holding element extends centrally from the leg mounting plate hinge surface and is comprised of a generally rectangular leg assembly holding element portion terminating in a leg assembly holding element cylindrical element, said leg assembly holding element rectangular portion having a longitudinal axis defined by said leg assembly holding element cylindrical element and said hinge surface, said rectangular leg assembly holding element portion longitudinal axis being perpendicular to said leg hinge plate;

wherein said leg assembly holding element cylindrical element has a flat side from which a cylindrical side wall extends toward a toothed side, said leg assembly holding element cylindrical element sides having radial planes parallel to each other and perpendicular to the plane of the hinge surface, said leg assembly holding element cylindrical element having a central aperture extending from the flat side through the toothed side, said leg assembly holding element cylindrical element having a circular channel surrounding the central aperture and extending from the toothed side toward the flat side, said leg assembly holding element cylindrical element having a plurality of radial teeth extending from said circular channel to a side perimeter defined by said side wall, said leg assembly holding element cylindrical element having a thickness defined as the distance between the leg assembly holding element cylindrical element flat side and toothed side, said leg assembly holding element cylindrical element thickness being approximately one-half the cross sectional width of the rectangular leg assembly holding element portion, said rectangular portion cross sectional width being defined as the distance between opposite rectangular portion sides.

7. A collapsible work station as recited in claim 6, wherein:
the leg hinge subassembly is comprised of a tubular element having a proximal end and a distal end, said proximal and distal ends defining a tubular element longitudinal axis, said tubular element proximal end terminates in a cylindrical element, said tubular element cylindrical element having a flat side from which a cylindrical side wall extends toward a toothed side, said tubular element cylindrical element having a threaded central aperture extending from the flat side through the toothed side, said tubular element cylindrical element having a circular channel surrounding the central aperture and extending from the toothed side toward the flat side, said tubular element cylindrical element toothed side having a plurality of radial teeth extending from said circular channel to a side perimeter defined by said side wall, said tubular element cylindrical element having a thickness defined as the distance between the cylindrical element flat side and toothed side, said cylindrical element thickness being approximately one-half the cross sectional diameter of the tubular element.

8. A collapsible work station as recited in claim 7, further comprising:
a conical spring inserted into the tubular element cylindrical element circular channel;
wherein the tubular element cylindrical element toothed side is joined with the leg assembly holding element cylindrical element toothed side in a toothed engagement;
wherein a knob with a threaded protrusion is inserted into the hinge holding element central aperture, threaded protrusion first through the flat side, past the toothed side, through the conical spring, into threaded engagement with the support plate holding element cylindrical element threaded central aperture.

9. A collapsible work station as recited in claim 8, further comprising:
a first leg tube having a proximal end, a distal end, a cylindrical side wall extending from the proximal end to the distal end, an exterior side wall surface, said side wall, proximal end and distal end defining a first leg tube hollow interior, said first leg tube cylindrical side wall having an aperture formed therein;
a leg hinge assembly tubular element cylindrical wall extending from said tubular element proximal end to said tubular element distal end, said tubular element cylindrical wall having an aperture formed therein;
wherein said tubular element distal end is inserted through the first leg tube proximal end into the first leg tube interior, said tubular element aperture being aligned with said first leg tube aperture;
a fastener inserted through the tubular element aperture and the first leg tube aperture, thereby fixedly fastening the tubular element and first leg tube together.

10. A collapsible work station as recited in claim 9, further comprising:
a second leg tube having a proximal end, a distal end, a cylindrical side wall extending from the proximal end to the distal end, an exterior side wall surface, said side wall, proximal end and distal end defining a first leg tube hollow interior;
wherein said second tube proximal end is inserted through the first leg tube distal end into the first leg tube interior in telescopic engagement.

11. A collapsible work station as recited in claim 10, further comprising:
a clamp assembly positioned adjacent the first leg tube distal end and adapted to hold the first leg tube in a position along the second leg tube exterior side wall surface, said clamp assembly being comprised of a clip element in engagement with a locking clamp.

12. A collapsible work station as recited in claim 11, wherein:
said clip element has an elongated body portion terminating in two ends, said clip element body portion being bent into a circular shape adapted to fit about the leg tube exterior surface, said ends protruding radially away from the circular body portion in a parallel relationship, each said end having an aperture formed therein, said end apertures being parallel with each other, one of said ends having a groove formed on an outer surface.

13. A collapsible work station as recited in claim 12, wherein said locking clamp is comprised of:
an elongated, curved element having an outer convex surface, a concave inner surface, a rounded gripping end and a holding end, said rounded gripping end and holding end defining a locking clamp elongated axis, said holding end being formed into two parallel rings, said rings having a central axis perpendicular to the locking clamp elongated axis, said rings each having off-centered central openings;
a cylindrical plug frictionally inserted into the ring openings, said cylindrical plug having a radial aperture formed therein along an approximate central diameter;
a fastener inserted through the clip element apertures into the plug aperture;
wherein said locking clamp rings are positionable against the clip element groove.

14. A collapsible work station as recited in claim 13, wherein each said mount assembly is further comprised of:
a backing plate having a generally rectangular shape,
a flat mounting surface, an opposite holding surface, a top edge, an opposite bottom edge, and two opposite side edges, said holding surface having a central groove formed horizontally across its face, said groove extending from side edge to side edge; and
a plurality of apertures formed in the backing plate, said apertures extending from the holding surface through the mounting surface, said apertures being located near to a junction of the top edge and a side edge, and to a junction of the bottom edge and a side edge.

15. A collapsible work station as recited in claim 14, further comprising:
an upwardly extending flange about said workboard perimeter edge.

16. A collapsible work station as recited in claim 15, wherein:
said second leg tube distal end terminates in a rubber footing.

17. A marine mount assembly, comprising:
a hinge subassembly comprised of:
a generally rectangular hinge plate having a hinge surface, an opposite gripping surface, a top edge, an opposite bottom edge, and two opposite side edges, said gripping surface having a central groove formed horizontally across its face, said groove extending from side edge to side edge;

a plurality of apertures formed in the hinge plate, said apertures extending from the gripping surface through the hinge surface, said apertures being located near to a junction of the top edge and a side edge, and to a junction of the bottom edge and a side edge;

a hinge holding element extending centrally out from the hinge plate hinge surface, comprising:

a generally rectangular hinge holding element portion terminating in a hinge holding element cylindrical element, said hinge holding element rectangular portion having a longitudinal axis defined by said hinge holding element cylindrical element and said hinge plate hinge surface, said hinge holding element rectangular portion longitudinal axis being perpendicular to said hinge plate;

wherein said hinge holding element cylindrical element has a flat side from which a cylindrical side wall extends toward a toothed side, said hinge holding element cylindrical element sides having radial planes parallel to each other and perpendicular to a hinge plate hinge surface plane, said hinge holding element cylindrical element having a central aperture extending from the flat side through the toothed side, said hinge holding element cylindrical element having a circular channel surrounding the central aperture and extending from the toothed side toward said flat side, said toothed side having a plurality of radial teeth extending from said circular channel to a side perimeter defined by said side wall, said hinge holding element cylindrical element having a thickness defined as the distance between the hinge holding element cylindrical element flat side and the toothed side, said hinge holding element cylindrical element thickness being approximately one-half a cross sectional width of the hinge holding element rectangular portion, said hinge holding element rectangular portion cross sectional width being defined as the distance between opposite rectangular portion sides; and a support plate subassembly attached to said hinge subassembly.

18. A marine mount assembly as recited in claim 17, wherein said support plate subassembly is comprised of:

a generally flat, rectangular holding plate having a flat upper surface, an opposite flat bottom surface, two opposite long side edges, and two opposite short side edges, said holding plate having a plurality of apertures formed therein, said holding plate apertures extending from the upper surface through the bottom surface, said holding plate being located near to a junction of a long edge and a side edge;

a support plate holding element extending centrally from one of the holding plate short edges, said support plate holding element being comprised of a generally rectangular support plate holding element portion terminating in a support plate holding element cylindrical element, said rectangular support plate holding element portion having a longitudinal axis defined by said support plate holding element cylindrical element and said holding plate short edge, said rectangular support plate holding element portion longitudinal axis being perpendicular to said holding plate short edge and being in a plane parallel to a holding plate flat upper surface plane;

wherein said support plate holding element cylindrical element has a flat side from which a cylindrical side wall extends toward a toothed side, said support plate holding element cylindrical element sides having radial planes parallel to each other and perpendicular to said holding plate flat upper surface plane, said support plate holding element cylindrical element having a threaded central aperture extending from the flat side through the toothed side, said support plate holding element cylindrical element having a circular channel surrounding the central aperture and extending from the toothed side toward said flat side, said support plate holding element cylindrical element toothed side having a plurality of radial teeth extending from said circular channel to a side perimeter defined by said side wall, said support plate holding element cylindrical element having a thickness defined as the distance between the support plate holding element cylindrical element flat side and toothed side, said support plate holding element cylindrical element thickness being approximately one-half the cross sectional width of the support plate holding element rectangular portion, said rectangular support plate holding element portion cross sectional width being defined as the distance between opposite rectangular portion sides.

19. A marine mount assembly as recited in claim 18, further comprising:

a conical spring inserted into the support plate holding element circular channel;

wherein the support plate holding element cylindrical element toothed side is joined with the hinge subassembly holding element cylindrical element toothed side in a toothed engagement;

wherein a knob with a threaded protrusion is inserted into the hinge holding element central aperture, threaded protrusion first through the flat side, past the toothed side, through the conical spring, into threaded engagement with the support plate holding element cylindrical element threaded central aperture.

20. A marine mount assembly as recited in claim 19, further comprising:

a backing plate having a generally rectangular shape, a flat mounting surface, an opposite holding surface, a top edge, an opposite bottom edge, and two opposite side edges, said holding surface having a central groove formed horizontally across its face, said groove extending from side edge to side edge; and a plurality of apertures formed in the backing plate, said apertures extending from the holding surface through the mounting surface, said apertures being located near to a junction of the top edge and a side edge, and to a junction of the bottom edge and a side edge.

* * * * *